(12) United States Patent
Angerer et al.

(10) Patent No.: US 12,434,291 B2
(45) Date of Patent: Oct. 7, 2025

(54) METHOD FOR THE TRANSPORT AND/OR HANDLING OF COMPONENTS

(71) Applicant: TRUMPF Maschinen Austria GmbH & Co. KG., Pasching (AT)

(72) Inventors: Gerhard Angerer, Altenberg (AT); Klemens Freudenthaler, Linz (AT); Florian Hausmann, Traun (AT); Matthias Hoerl, Linz (AT); Nenad Kovjenic, Linz (AT); Florian Maier, Leonding (AT); Michael Schernhammer, Leonding (AT); Verena Steininger, Linz (AT); Helmut Theis, Pfarrkirchen (AT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 146 days.

(21) Appl. No.: 17/766,697

(22) PCT Filed: Sep. 21, 2020

(86) PCT No.: PCT/AT2020/060340
§ 371 (c)(1),
(2) Date: Apr. 5, 2022

(87) PCT Pub. No.: WO2021/068012
PCT Pub. Date: Apr. 15, 2021

(65) Prior Publication Data
US 2024/0051010 A1 Feb. 15, 2024

(30) Foreign Application Priority Data
Oct. 10, 2019 (AT) .................. 50868/2019

(51) Int. Cl.
*B21D 43/10* (2006.01)
*B21D 5/02* (2006.01)
*B25J 5/02* (2006.01)

(52) U.S. Cl.
CPC ......... *B21D 43/105* (2013.01); *B21D 5/0281* (2013.01); *B25J 5/02* (2013.01)

(58) Field of Classification Search
CPC .... B21D 5/0281; B21D 43/105; B21D 43/10; B21D 43/22; B21D 43/24; B25J 5/02
See application file for complete search history.

(56) References Cited

U.S. PATENT DOCUMENTS 4,989,444 A * 2/1991 Murakami ............... B25J 9/042
72/422
5,150,451 A 9/1992 Deplano
(Continued)

FOREIGN PATENT DOCUMENTS

CN 103029127 A 4/2013
CN 106003119 A 10/2016
(Continued)

OTHER PUBLICATIONS

International Search Report in PCT/AT2020/060340, mailed Dec. 16, 2020.

*Primary Examiner* — Debra M Sullivan
(74) *Attorney, Agent, or Firm* — Collard & Roe, P.C.

(57) ABSTRACT

A method transports and/or handles components, in particular sheet metal parts, and a production plant includes a manipulator arrangement having a first manipulator arm and at least one second manipulator, wherein the first manipulator and the at least one second manipulator are designed to pick up, transport, hold and/or deposit a component, at least one processing device for carrying out processing steps on the component, wherein the component is transferred from the first manipulator to the at least one second manipulator (Continued)

after a first processing cycle at a predetermined re-gripping time, the re-gripping time being between the first processing cycle and at least one second processing cycle, wherein the component at least in portions rests on the processing device during the re-gripping time and is supported in a load-dissipating manner solely by the processing device.

15 Claims, 8 Drawing Sheets

(56) References Cited

U.S. PATENT DOCUMENTS

| | | | |
|---|---|---|---|
| 5,345,806 | A | 9/1994 | Sartorio et al. |
| 7,278,288 | B2 | 10/2007 | Reissenweber |
| 8,074,484 | B2 | 12/2011 | Denkmeier et al. |
| 8,602,474 | B2 | 12/2013 | Xie et al. |
| 9,498,887 | B1 | 11/2016 | Zevenbergen et al. |
| 10,639,693 | B2 | 5/2020 | Yogo et al. |
| 2013/0160508 | A1* | 6/2013 | Fischereder ........... B21D 43/26 72/6.1 |
| 2015/0217359 | A1 | 8/2015 | Segura Golorons et al. |

FOREIGN PATENT DOCUMENTS

| | | | | |
|---|---|---|---|---|
| CN | 107718032 | A | 2/2018 | |
| DE | 8817048 | U1 | 3/1992 | |
| DE | 10050481 | A1 | 5/2002 | |
| DE | 69823773 | * | 5/2005 | ............ B21D 43/02 |
| DE | 69823773 | T2 | 5/2005 | |
| DE | 10 2004 035 797 | B3 | 2/2006 | |
| DE | 10 2007 042 638 | A1 | 3/2009 | |
| DE | 10 2009 058 905 | A1 | 6/2011 | |
| DE | 10 2014 014 404 | A1 | 4/2016 | |
| EP | 0 354 559 | A1 | 2/1990 | |
| EP | 0 434 632 | A2 | 6/1991 | |
| EP | 0 461 275 | B1 | 6/1995 | |
| EP | 0 914 879 | A1 | 5/1999 | |
| EP | 1 916 072 | A1 | 4/2008 | |
| EP | 2 138 247 | A2 | 12/2009 | |
| EP | 3 284 547 | A1 | 2/2018 | |
| JP | S6071548 | U | 5/1985 | |
| JP | S61273465 | A | 12/1986 | |
| JP | H02-53817 | U | 4/1990 | |
| JP | H08-216073 | A | 8/1996 | |
| JP | 2012059119 | A | 3/2012 | |
| WO | 03/095125 | A2 | 11/2003 | |

* cited by examiner

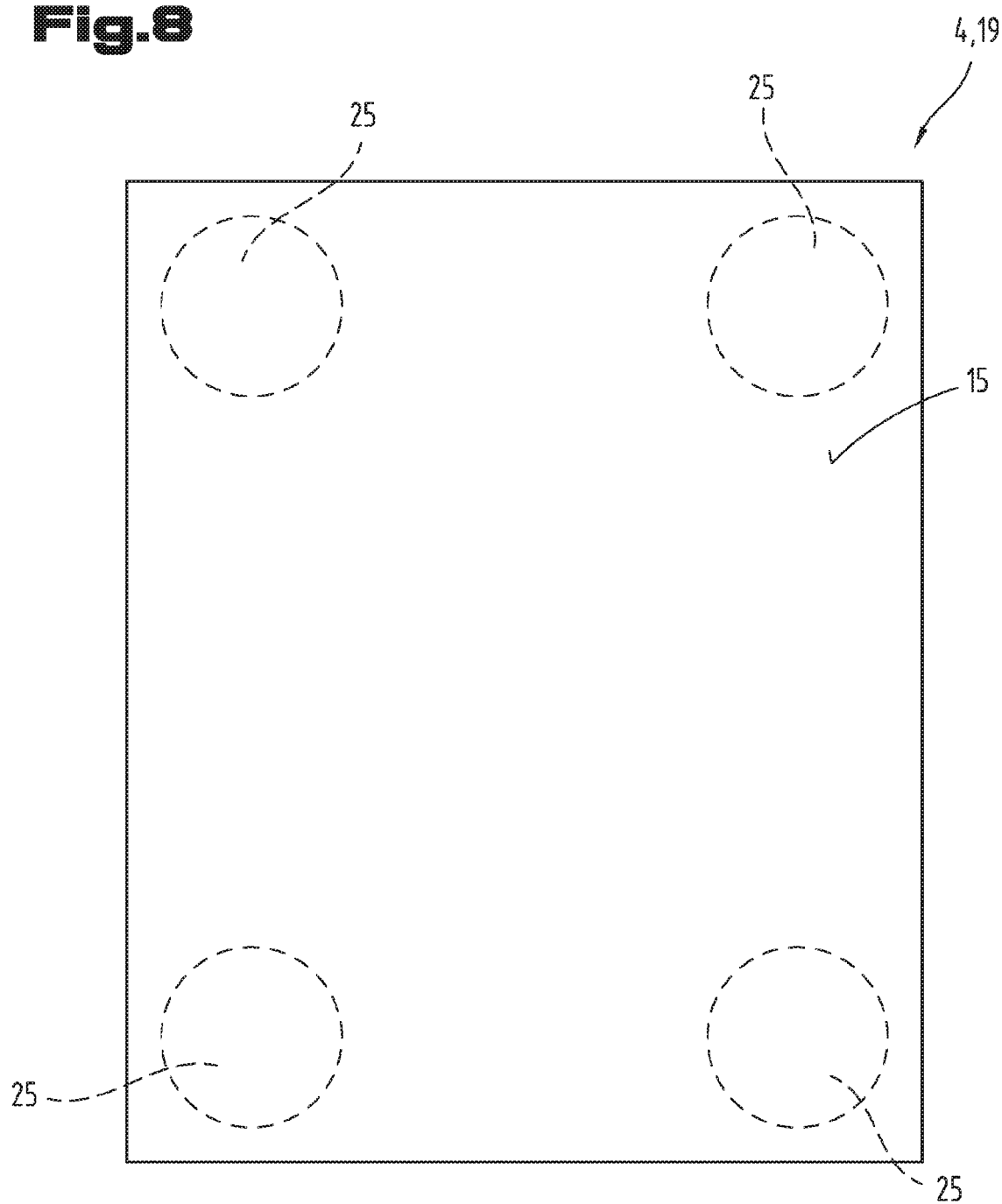

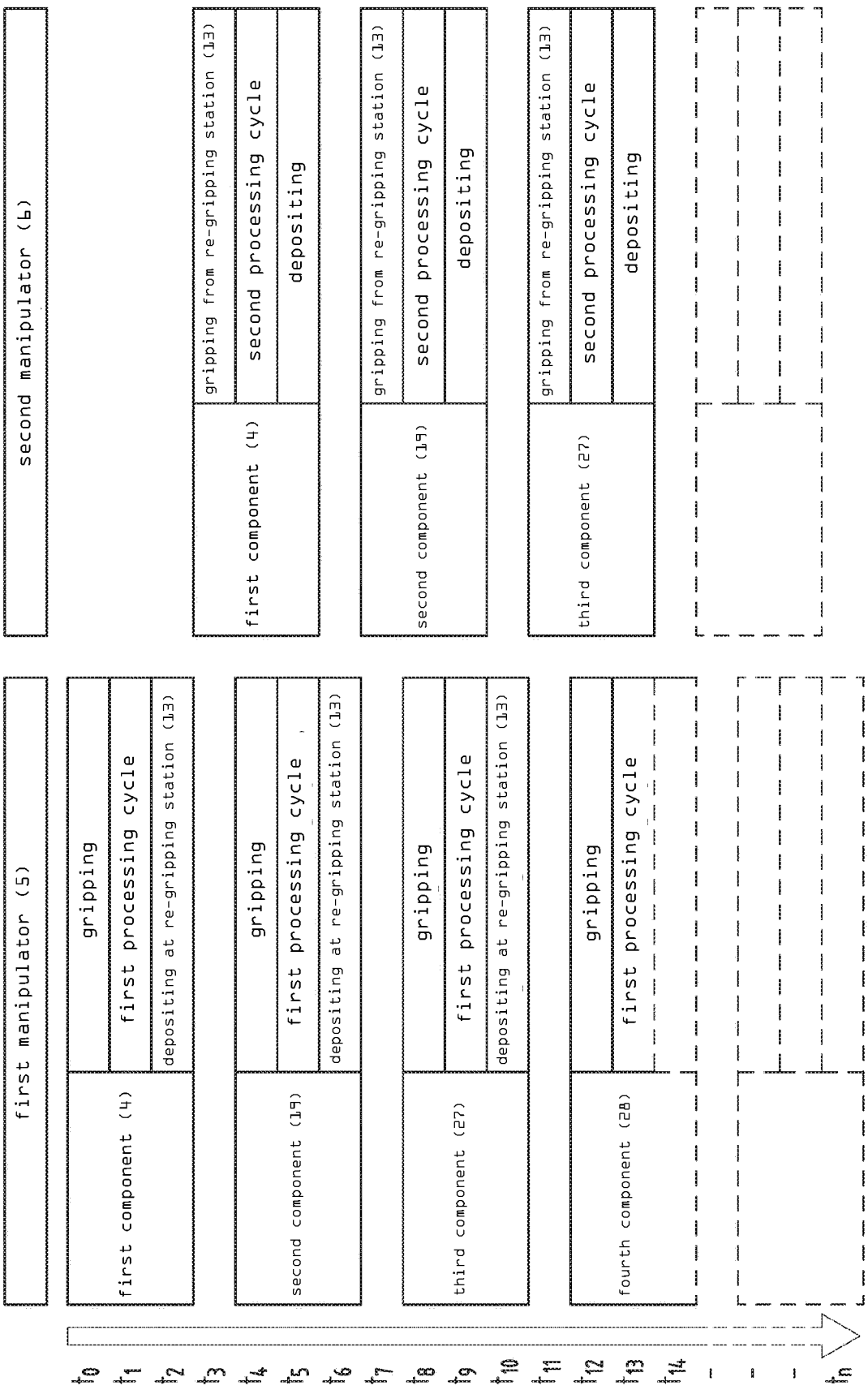

METHOD FOR THE TRANSPORT AND/OR HANDLING OF COMPONENTS

CROSS REFERENCE TO RELATED APPLICATIONS

This application is the National Stage of PCT/AT2020/060340 filed on Sep. 21, 2020, which claims priority under 35 U.S.C. § 119 of Austrian Application No. A 50868/2019 filed on Oct. 10, 2019, the disclosure of which is incorporated by reference. The international application under PCT article 21(2) was not published in English.

BACKGROUND OF THE INVENTION

1. Field of the Invention

The invention relates to a method for transporting and/or handling components, and a production plant as it is indicated in the claims.

2. Description of the Related Art

In modern production plants, workpiece and/or component transport is often carried out in a fully automated manner. For this purpose, the use of different manipulators with gripping means, such as vacuum grippers, has become established.

In order to increase the throughput and increase the speed of component transport and/or component handling in the course of a processing operation in this regard, different approaches are known to the person skilled in the art.

For example, regarding the reduction of cycle times, it results from the prior art that, as part of sheet metal processing, multiple gripping devices can be provided for processing workpieces.

DE 8817048 U1 shows a device for handling, in particular transporting, workpieces between two neighboring processing stations, for example in the form of two sheet metal presses. In this regard, two handling robots are arranged one above the other between the two processing stations, wherein the handling robots work in opposite directions and can be controlled separately with reciprocal adjusting of the motion sequences.

EP 3284547 A1 discloses that gripping devices can act collaboratively in the course of a sheet metal processing operation. In this regard, for example a workpiece can be collected by a first gripping device and then be bent by means of a second gripping device.

US 2015217359 A1 shows a stacking device for sheet metals having multiple gripping robots, wherein multiple robots can, for example, simultaneously grip and transport a sheet metal.

DE 102004035797 B3 shows that a workpiece can be transferred from a first to a second handling device in a transfer position.

EP 0461275 B1 discloses a device for processing sheet metals with a main manipulator unit and an auxiliary manipulator unit, in order to for example collect a workpiece from a metal processing machine and to transfer another workpiece to said machine.

SUMMARY OF THE INVENTION

The object of the present invention was to overcome the shortcomings of the prior art and to provide a method, by means of which the speed and/or productivity of a production can be improved. Furthermore, the object of the invention is to allow for parts preparation, parallel to main time, for workpieces for one or multiple processing operations.

This object is achieved by means of a device and a method according to the claims.

The invention relates to a method for transporting and/or handling components, in particular sheet metal parts, comprising a manipulator arrangement with a first manipulator and at least one second manipulator, wherein the first manipulator and the at least one second manipulator are designed to grip, to transport, to hold and/or to deposit a component, at least one processing device for performing processing steps on the component, wherein, after a first processing cycle, a transfer of the component from the first manipulator to the at least one second manipulator takes place at a predefined re-gripping time, wherein the re-gripping time takes place between the first processing cycle and at least one second processing cycle, and wherein, during the re-gripping time, the component at least in some sections rests on the processing device and is supported in a load-dissipating manner solely by the processing device.

When transferring a component at a predetermined and/or defined re-gripping time between two processing cycles, the cycle time can be reduced and thus, the productivity of processing components can be increased substantially. In this regard, the transfer of components can take place between two manipulators, wherein in the course of the transfer, the component is supported in a load-dissipating manner solely by the processing device and/or integral elements of the processing device. A load-dissipating support of the component may be the resting on a holding device and/or a rest section of the processing device.

The manipulators may be handling devices for components of any kind, such as multi-axial industrial robots.

Instead of two manipulators, it is also conceivable in this regard that a plurality of manipulators are arranged in the region of a production plant with at least one processing device, wherein a transfer and/or forwarding of components takes place between the plurality of manipulators. The at least one processing device may be, by way of example, a bending machine, such as a press brake or a swivel bending machine. If multiple processing devices are provided within a production plant for processing components, processing devices of different types, such as a press brake and a swivel bending machine, may be provided. In this regard, the individual processing devices may be used collaboratively.

The re-gripping time is a period of time and/or a length of time, during which the component at least in some sections rests on the processing device and is supported in a load-dissipating manner solely by the processing device. During this period of time, the first manipulator, which has deposited the component, is moved away from the component, and the second manipulator, which collects the component, is moved towards the component.

In the course of the transfer of the component, it can be gripped by the second manipulator at a different position of the component than by the first manipulator. Thereby, a positional change of the component can be achieved, which is necessary and/or desired for a subsequent processing cycle. A positional change may be a flipping and/or rotating of the component, in order to bring it into a position, in which further processing steps can be performed. Advantageously, the re-gripping time is set at a defined point in time, at which a positional change of the component is desired. In this regard, multiple transfers and/or multiple re-gripping operations are conceivable.

The processing steps of a processing cycle may in this regard be bending steps on a sheet metal part. In this regard, bending steps requiring a first spatial position of the component may be performed in the first processing cycle, and in the second processing cycle, bending steps requiring a second spatial position of the component may be performed. When processing sheet metal parts on a bending machine, the first manipulator may be a loading and/or feeding robot, which can preferably also support a bending process of the component. The at least one second manipulator may be a removal robot for the processed component with respect to the bending machine, wherein the at least one second manipulator may also support a bending process of the component.

In addition to the positional change of a component at a defined re-gripping time, a component preparation parallel to the main time is also made possible by the method according to the invention, wherein simultaneously, processing steps may be performed on one component while a further component is transported to the processing device. Moreover, a completely processed component can be transported away from the processing device while processing steps on another component are in progress. Thus, the cycle time can further be reduced, and the productivity of the processing device can be increased. Moreover, a consistent workload and/or apportionment of work between multiple manipulators can be achieved.

In order to save travel and to further increase productivity, according to the invention, the transfer of the component is carried out directly at the processing device. The transfer time is advantageously selected to be a re-gripping time at which a positional change, in particular a turn regarding the upper side and bottom side of the component is desired.

After the first component has been gripped by the first manipulator, a first processing cycle with multiple processing steps begins. In the course of this, multiple bevel and/or bending steps are performed on a sheet metal part. Then, the component is deposited at the re-gripping time, wherein the component at least in some sections rests on the processing device and is supported in a load-dissipating manner solely by the processing device. In the next step, the component is gripped by the second manipulator, and a second processing cycle with a plurality of processing steps is started. Meanwhile, a second component is gripped by the first manipulator. While the first component is deposited by the second manipulator, a first processing cycle on the second component begins. Advantageously, thus, not only the collection of components but also the deposition of components is performed parallel to the main time, which further leads to a reduction of the production time and an increase of productivity.

When performing the method according to the invention, the time required for the re-gripping process in the course of the transfer of components between multiple robots is reduced.

Furthermore, it is advantageous that both the first and the second manipulator can feed a component to a processing device, can support and/or brace components during a processing step, and can reposition or de-thread components in the course of the transfer.

Furthermore, it may be useful if the component comprises a first gripping surface and a second gripping surface different from the first gripping surface, wherein the component is gripped by the first manipulator on the first gripping surface and by the at least one second manipulator on the second gripping surface.

The first and/or second gripping surface can in turn comprise multiple partial sections, on which the component is gripped and held in the course of a transport until being deposited.

Advantageously, the first gripping surface is situated in a different partial area of the component than the second gripping surface. If, for example in the case of a sheet metal part, the first gripping surface is situated on the upper side of the sheet metal part and the second gripping surface is situated on the bottom side of the sheet metal part, the sheet metal part can be held during the first processing cycle on the upper side of the sheet metal part with the aid of vacuum suction cups. The sheet metal part can then be deposited at the re-gripping time, wherein the component at least in some sections rests on the processing device and is supported in a load-dissipating manner solely by the processing device.

In further consequence, the sheet metal part can be gripped by the second manipulator on the bottom side, in order to perform further processing steps and/or to begin the second processing cycle.

In this regard, a positional change of the component is advantageously made possible. Moreover, as the component is now being held at a different position by the vacuum suction cups of the second manipulator, processing steps can be performed which require, on the one hand, the new position of the component and, on the other hand, a repositioning of holding and/or gripping means such as vacuum suction cups.

In an advantageous advancement, it may be provided that the component is gripped on the first gripping surface, which is formed on the upper side of the component, and on the second gripping surface, which is formed on the bottom side of the component.

This advancement advantageously allows for a plurality of conceivable variants for processing of the component.

Furthermore, it may be provided that during the at least one second processing cycle, a second component is gripped by the first manipulator.

In this regard, the component may be gripped from a stack or be taken over from a feeding unit. Advantageously, a parts preparation that is parallel to main time can thereby still be performed, which may lead to a reduction of cycle times and production times. While the second component is being gripped by the first manipulator, processing steps can be performed on the first component, wherein it is held by the second manipulator. Moreover, the manipulators may also, in case the component is a sheet metal part, act as a bending aid.

Furthermore, it may be provided that during the first processing cycle on the second component, the first component is deposited by the at least one second manipulator.

In this regard, it may be deposited on a stack, a conveying means and/or a further manipulation unit. Advantageously, with a parts deposition parallel to main time, the production time can further be reduced.

An embodiment, according to which it may be provided that the component is deposited by the first manipulator at a re-gripping station, and that the component is gripped from the regripping station by the at least one second manipulator, is also advantageous.

If the processing device is designed as a bending machine, the re-gripping station may also be a bending aid. In this regard, the re-gripping station is advantageously designed to be adjustable, such as pivotable and/or displaceable in the longitudinal direction of the processing device. At a re-gripping time, the re-gripping station can be moved and/or pivoted into a rest section and/or re-gripping section. After the transfer to the second manipulator, thus, the entire processing section and/or processing region of the processing device can be released, which leads to an increased flexibility of the processing device. While the processing steps are being carried out on the component, the rest section and/or re-gripping section can therefore be released.

The re-gripping station can thus be designed to be flexible such that it is available only at the re-gripping time.

Moreover, a manipulation of the component by means of the re-gripping station is conceivable, for example a rotating about a specific angle range by the re-gripping station being designed to be rotatable. In this regard, a rotatable re-gripping station may be a type of rotary plate.

Furthermore, it is provided that the re-gripping station is designed as a handling device at the processing device, wherein the processing device comprises a waiting section and a re-gripping section for the handling device, and wherein the handling device is moved out of the waiting section into the re-gripping section before the re-gripping time and moved out of the re-gripping section into the waiting section after the re-gripping time.

In this regard, the handling device can be a bending aid or an additional manipulator, which is designed to be displaceable into the re-gripping section and/or rest section at the re-gripping time. In order to release the entire processing section for carrying out processing steps, the handling device is advantageously displaceable into a waiting section, wherein said waiting section may be provided laterally on the processing device. Alternatively to this, the waiting section may also be a separate storage space for the handling device.

The re-gripping section and/or rest section on which the component at least in some sections rests during the re-gripping time and is supported in a load-dissipating manner solely by the processing device and/or integral elements of the processing device, such as the handling device, may be a defined location and/or position, which is particularly favorable for re-gripping. For example, the re-gripping section may be provided along the processing section and/or the processing sections of the processing device, such that the re-gripping section is a position for carrying out the second processing cycle.

The re-gripping section may, in this regard, also be variably designed in that the handling device is designed to be displaceable on rails or so it can be folded up and folded out.

Furthermore, it may be useful if the component at least in some sections rests on and is supported in a load-dissipating manner on at least one tool of the processing device while the component is gripped by the at least one second manipulator.

As an alternative to a re-gripping station and/or a handling device for depositing the component during the re-gripping time, one or multiple tools of the processing device may also serve for components to be deposited on. Advantageously, no additional constructional devices have to be provided in this regard. If the component is a sheet metal part and the processing device is a bending machine, the components can rest on and/or be support in a load-dissipating manner on the lower tools of the bending machine. In this regard, the lower tools act as a rest section and/or re-gripping station. In this regard, a clamping with the aid of upper and lower tools of the bending machine for a secure retaining of the component in the course of the transfer is also conceivable.

According to a practical measure, it may also be provided that the component is formed by a sheet metal part, the at least one processing device is formed by a bending machine, and the at least one tool is formed by upper tools and lower tools of the bending machine, wherein the sheet metal part, during the gripping by the at least one second manipulator, is clamped between the upper tools and lower tools, and the sheet metal part, during the gripping by the at least one second manipulator, is not contacted or not impinged by the first manipulator.

In this regard, it is particularly advantageous if the upper tools and lower tool of the bending machine are formed as corresponding upper and lower bending tools.

This advantageous measure of a temporary clamping of a sheet metal part in the course of the transfer to the second manipulator particularly entails advantages with respect to stability and safety during the transfer.

Additionally, it is achieved that the first manipulator is available for further processing steps on subsequent components. Thereby, the plant efficiency is further increased, and the interaction of manipulators is additionally optimized in an advantageous manner.

According to an advancement, it is possible that the predetermined re-gripping time between the first manipulator and the at least one second manipulator takes place between a first bending operation for producing a first deformation in the component and a second bending operation for producing a second deformation in the component, which second deformation extends in a mirror-inverted manner to the first deformation, in particular before an essentially Z-shaped cross-sectional extension is formed in the component.

In particular, the first and second deformation may be an angular bend of the component. This advancement is to be considered advantageous particularly because by re-gripping between the two forming and/or angular bending steps, mirror-inverted processing steps can be performed efficiently.

Furthermore, it may be provided that the first manipulator and the at least one second manipulator are displaced along a common travel path in the longitudinal direction.

In this regard, advantageously, a single travel path is used jointly. The travel path may, for example, be a rail arrangement, along which the manipulator can be guided and displaced in the longitudinal direction towards the processing device.

When using the travel path jointly, it is also advantageous in this regard that a floor track can be used jointly, and the manipulators can be designed to be mostly identical. Thus, a plurality of common parts can be built into the manipulator, which allows for an easier maintenance and repair. In this regard, the manipulators can meet in any region of the travel path, where a transfer of a component can take place.

Furthermore, it may be provided that the first manipulator is displaced along a first travel path in the longitudinal direction, and that the at least one second manipulator is displaced along a second travel path, which second travel path extends in parallel with the first travel path, in the longitudinal direction.

Advantageously, when forming two travel paths, arranged in parallel with one another, for the manipulators, the first manipulator and the second manipulator can move past one another. Thereby, the flexibility of the production plant can further be increased, whereby a further reduction of the production time can be achieved.

Moreover, the second travel path may also be designed to be suspended, above the first travel path. In this case, the second manipulator may be mounted in a suspended manner, above the first manipulator. In this case, the two manipulators may again be designed to be mostly identical.

According to a particular embodiment, it is possible that the at least one second processing cycle is carried out on a second processing device.

Advantageously, in this case, the second processing device may be equipped with tools deviating from those of the first processing device, such as bending tools. After carrying out a first processing cycle on the component on the first processing device, a second processing cycle on the second processing device can therefore be started immediately without additional changing of tools.

In this regard, processing devices of different types are also conceivable. For example, the first processing device may be a press brake and the second processing device may be a swivel bending machine. Thereby, the production and/or manufacturing time can be reduced further, and the flexibility of the production plant can be increased.

The invention further relates to a production plant comprising a manipulator arrangement having a first manipulator and at least one second manipulator, at least one processing device for carrying out processing steps on a component, wherein a rest section is provided on the processing device, in which rest section the component can be supported in a load-dissipating manner during the re-gripping time.

By means of the production plant according to the invention, the transfer of the component takes place directly on the processing device, wherein the rest section may be an integral element and/or assembly group of the processing device. In the course of the transfer, the component is placed down by the first manipulator and collected by the second manipulator. While neither the first manipulator nor the second manipulator grips the component, the component is supported in a load-dissipating manner by the processing device.

For gripping, transporting, and holding components, gripping means such as vacuum suction cups or pincer grippers may be provided on the manipulators.

Advantageously, the component is gripped by the manipulators at different locations and/or gripping surfaces, whereby, in the course of the transfer, a positional change of the component and/or a re-gripping is made possible. Thus, a position of the component desired for a second processing cycle can be achieved easily.

If the second processing cycle is carried out with the aid of the second manipulator, the first manipulator can already grip a further component from a loading zone and/or from a stack and transport it to the processing device. While the first component is placed down by the second manipulator in an unloading zone and/or on a stack, a processing cycle on the newly fed component can already begin and/or be carried out.

Due to the transport, parallel to main time, of components towards and away from a processing device, the cycle time is reduced according to the invention and thus, the productivity of the production plant is increased.

Moreover, it is provided that a re-gripping station is formed in the rest section, by which re-gripping station the component can be supported in a load-dissipating manner during the re-gripping time.

Advantageously, the re-gripping station is designed to be adjustable, such as pivotable and/or displaceable in the longitudinal direction of the processing device. At a re-gripping time, the re-gripping station can be moved and/or pivoted into a rest section and/or re-gripping section.

After the completed transfer to the second manipulator, thus, the entire processing section and/or processing region of the processing device can be released, which leads to an increased flexibility of the processing device. While the processing steps are being carried out on the component, the rest section and/or re-gripping section can therefore be released.

The re-gripping station can thus be designed to be flexible such that it is available only at the re-gripping time.

Furthermore, it is provided that the re-gripping station is designed as a handling device at the processing device, wherein the processing device comprises a waiting section and a re-gripping section for the handling device, and wherein the handling device can be moved out of the waiting section into the re-gripping section and vice versa.

In this regard, the handling device can be a bending aid or an additional manipulator, which is designed to be displaceable into the re-gripping section and/or rest section at the re-gripping time. In order to release the entire processing section for carrying out processing steps, the handling device is advantageously displaceable into a waiting section, wherein said waiting section may be provided laterally on the processing device. Alternatively to this, the waiting section may also be a separate storage space for the handling device.

Furthermore, it may be provided that a common travel path for the first manipulator and for the at least one second manipulator is provided.

Advantageously, a single travel path is used jointly in this regard, wherein the manipulator displaceable thereon can meet in any region of the travel path, where a transfer of a component may occur.

An embodiment, according to which it may be provided that a first travel path for the first manipulator and a second travel path for the at least one second manipulator is provided, is also advantageous.

Advantageously, when forming two travel paths, arranged in parallel with one another, for the manipulators, the first manipulator and the second manipulator can move past one another, and/or can be moved at any point of the respective travel path. Thereby, the flexibility of the production plant can further be increased, whereby a further reduction of the production time can be achieved.

According to an advancement, it is possible that a second processing device is provided, on which at least a second processing cycle can be carried out.

After carrying out a first processing cycle on the component on the first processing device, a second processing cycle on the second processing device can therefore be started immediately without additional changing of tools. The second processing device may also be a processing device of a different type, on which processing steps different from those on the first processing device can be carried out. Thereby, the production and/or manufacturing time can be reduced further, and the flexibility of the production plant can be increased.

BRIEF DESCRIPTION OF THE DRAWINGS

For the purpose of better understanding of the invention, it will be elucidated in more detail by means of the figures below.

These show in a respectively very simplified schematic representation:

FIG. 7 a component having a first gripping surface and a second gripping surface in a lateral view;

FIG. 8 the component having multiple partial sections of the first gripping surface in a top view;

FIG. 9 a flowchart with multiple processing cycles on multiple components.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
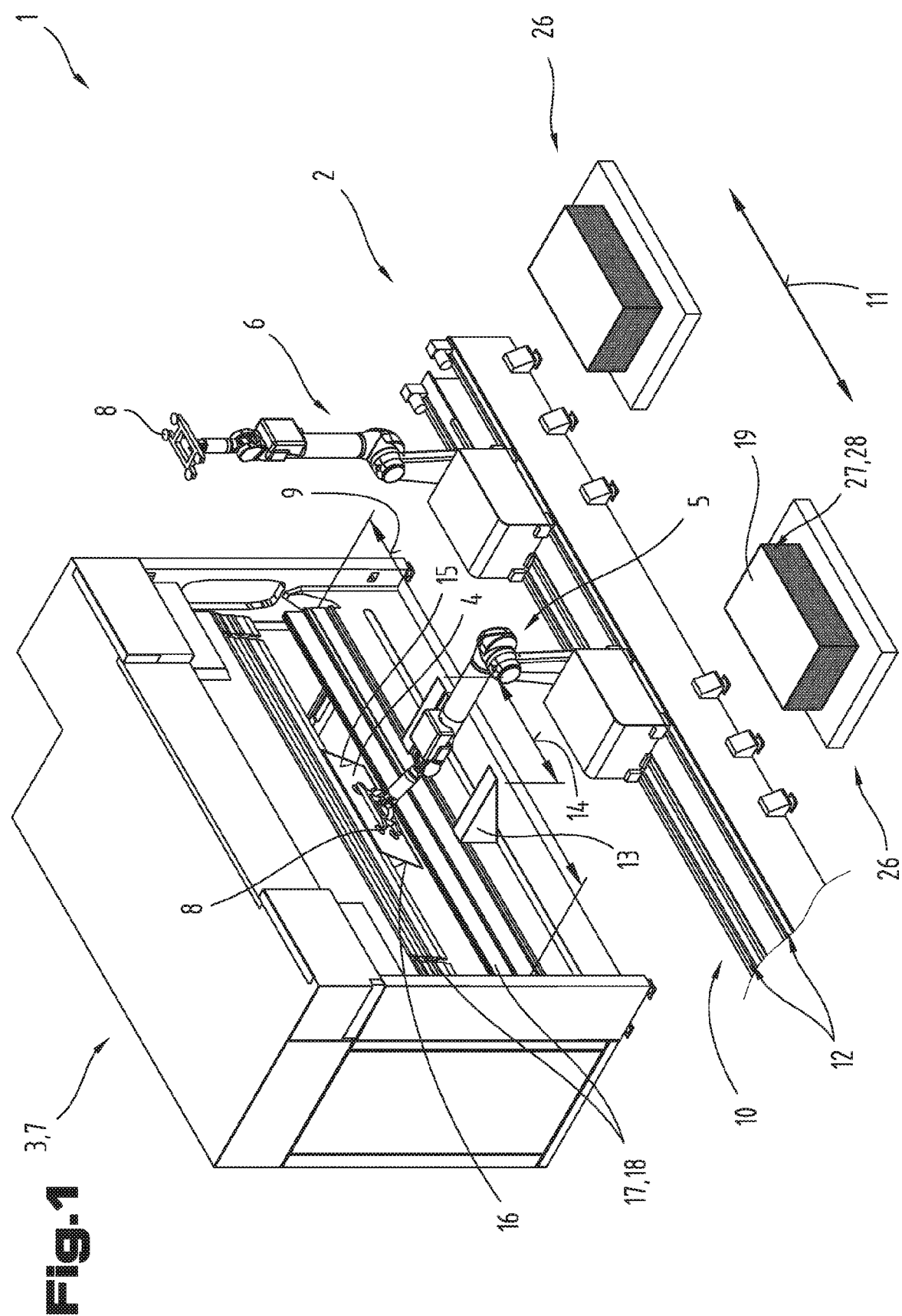
FIG. 1 a production plant having a manipulator arrangement and a processing device, wherein a first processing cycle is carried out on a first component.

In FIG. 1, a production plant 1 having a manipulator arrangement 2 and a processing device 3 is shown, wherein a first processing cycle is carried out on a first component 4.

The manipulator arrangement 2 comprises a first manipulator 5 and a second manipulator 6 and/or at least one second manipulator 6, wherein the first manipulator 5 and the at least one second manipulator 6 is designed to grip, transport, hold and/or deposit the component 4. By way of example, FIG. 1 shows a press brake 7 as a processing device 3 for carrying out processing steps on the component 4. For gripping, transporting, holding and/or depositing the component 4, multiple vacuum suction cups 8 are provided both on the first manipulator 5 and on the second manipulator 6.

According to the representation in FIG. 1, a processing step of a first processing cycle on the first component 4 is underway. In this regard, the first processing cycle may comprise one or multiple processing steps, wherein the exemplary represented embodiment shows a defined sequence of bending steps. During the first processing cycle, the first component 4 is held by multiple vacuum suction cups 8 of the first manipulator 5, and/or the first component 4 is moved by the first manipulator 5 to different processing sections 9 of the press brake 7 in order to carry out a sequence of bending steps on the component 4.

In order to displace the first manipulator 5 and the second manipulator 6, a first travel path 10 is provided, along which the first manipulator 5 and the second manipulator 6 can be displaced in the longitudinal direction 11 towards the processing device 3 and/or press brake 7, in order to be able to move the component 4 to the different processing sections 9 of the processing device 3 and/or press brake 7. In the different processing sections 9 of the processing device 3 and/or press brake 7, which may be defined by bending tools of different designs and/or of different length, the individual processing steps and/or bending steps of the processing cycles are carried out.

In doing so, the first manipulator 5 and the second manipulator 6 use the same and/or a common travel path 10 with a rail arrangement 12. In an exemplary embodiment not shown in more detail, it is also conceivable that the first manipulator 5 and the second manipulator 6 are displaceable and/or movable along a defined region in the longitudinal direction 11 instead of along a rail arrangement 12.

Figure 2:
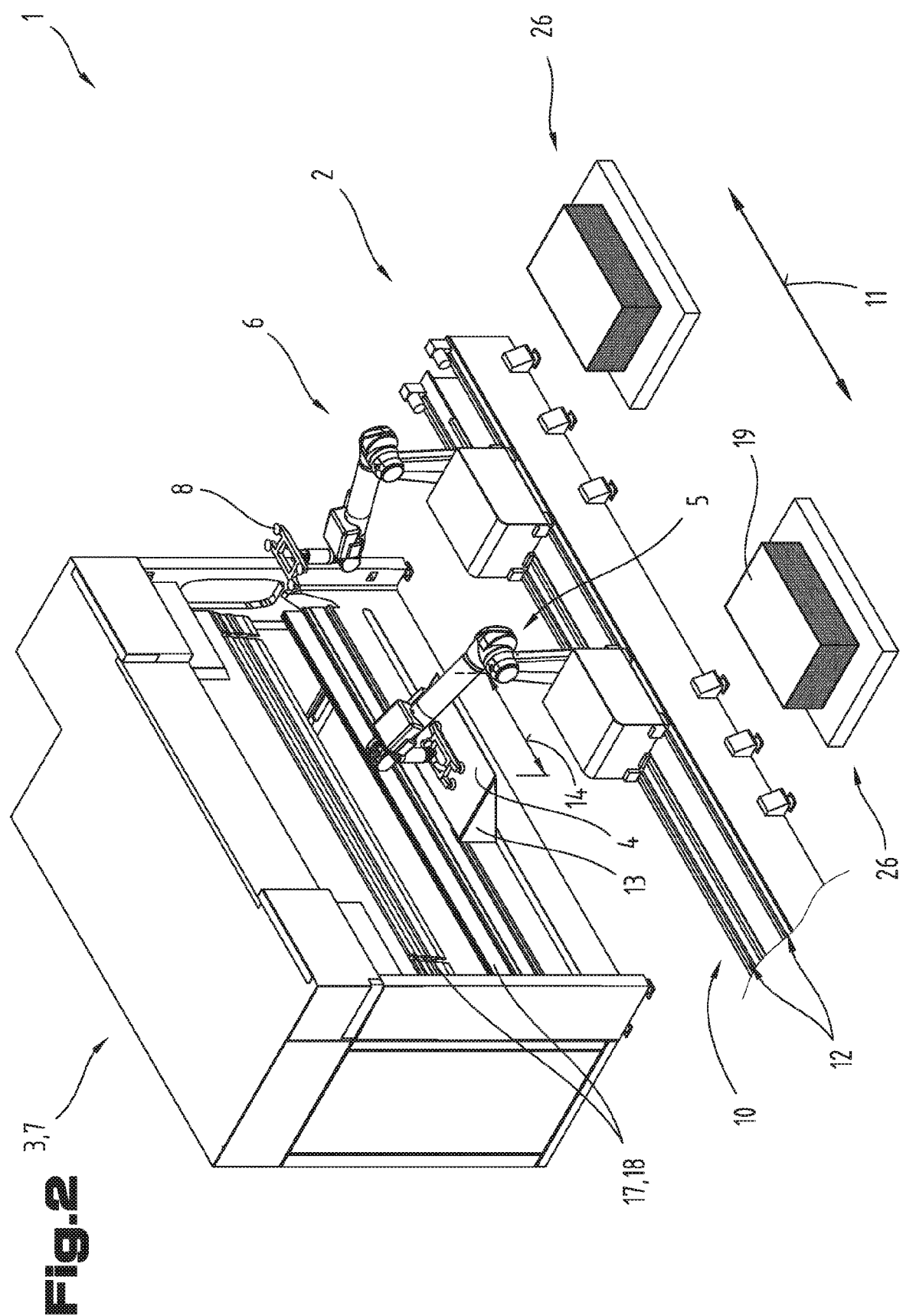
FIG. 2 the production plant having the manipulator arrangement and the processing device, wherein the first component is deposited by a first manipulator at a re-gripping station.

FIG. 2 shows the production plant 1 having the manipulator arrangement 2 and the processing device 3, wherein the first component 4 is deposited by the first manipulator 5 at a re-gripping station 13, on which the component 4 is supported in a load-dissipating manner during a regripping time. In this regard, the re-gripping station 13 is formed in a feed section of the processing device 3 and/or in a rest section 14 of the production plant 1.

After a first processing cycle, with at least one processing step, thus, a transfer of the first component 4 from the first manipulator 5 to the at least one second manipulator 6 takes place at a predetermined re-gripping time. In this regard, the re-gripping time takes place between the first processing cycle and at least one second processing cycle, which again has at least one processing step and/or bending step.

In the course of re-gripping, the position of the component 4 can be changed. For example, the component 4 may be turned and/or rotated such that it assumes a spatial position required for a second processing cycle.

During the re-gripping time, the component 4 at least in some sections rests on the processing device 3 in the region of the rest section 14 and is supported in a load-dissipating manner solely by the processing device 3 and/or integral elements of the processing device 3.

In this regard, the first component 4 comprises a first gripping surface 15 and a second gripping surface 16, wherein the component 4 is gripped by the first manipulator 5 on the first gripping surface 15 and/or is deposited at the re-gripping station 13.

In an alternative embodiment, not shown in further detail, the rest section 14, in which the component 4 can be supported in a load-dissipating manner during a re-gripping time, may also be a region in the processing section 9, in which the component 4 is supported in a load-dissipating manner by means of a tool 17 of the processing section 3. In this regard, it is further conceivable that, by means of the bending tools 18 of a press brake 7, the component is supported and/or held, wherein an additional clamping by means of the bending tools 18 is also conceivable.

Figure 3:
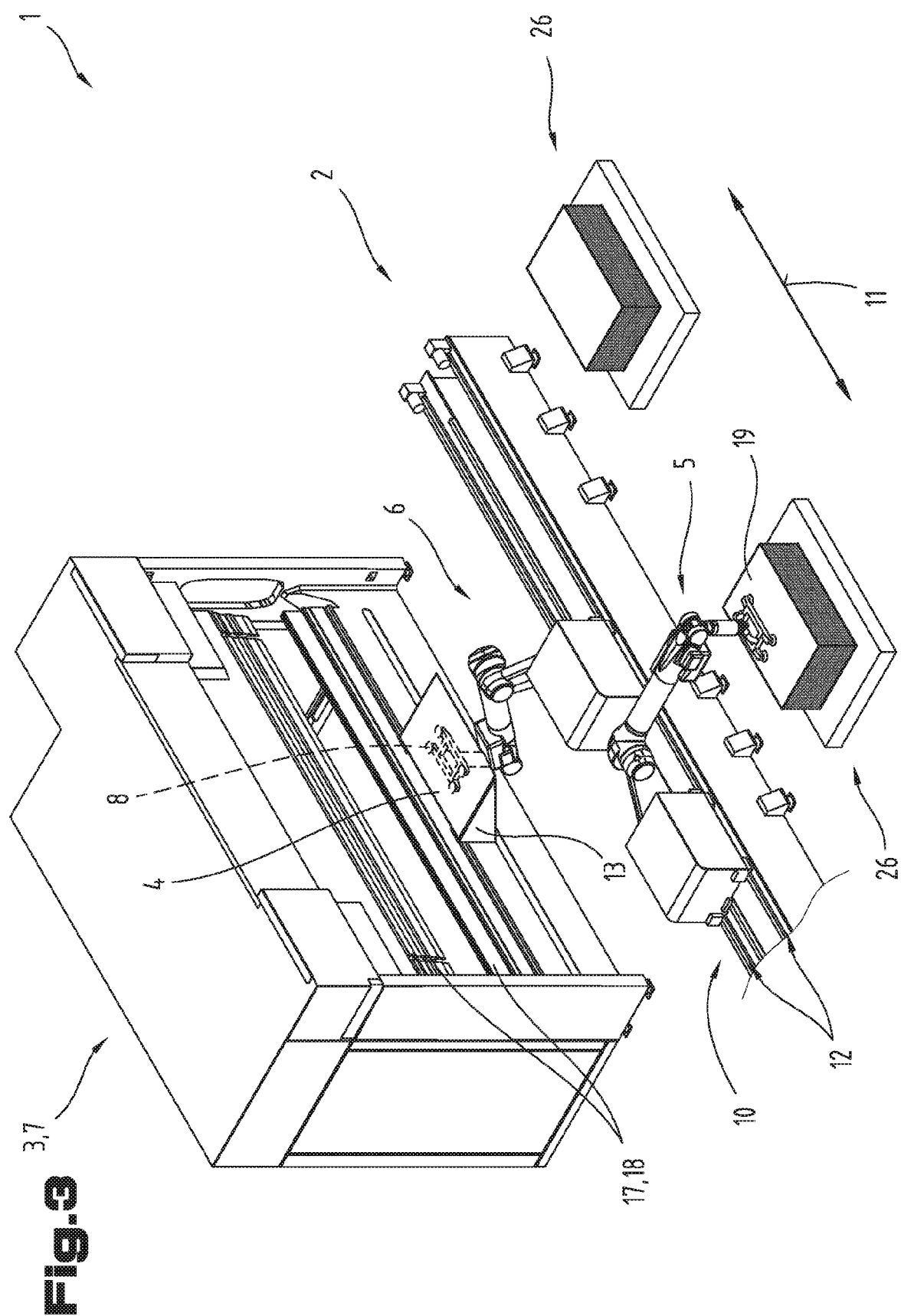
FIG. 3 the production plant having the manipulator arrangement and the processing device, wherein the first component is collected by a second manipulator at the regripping station.

FIG. 3 shows the production plant 1 having the manipulator arrangement 2 and the processing device 3, wherein the first component 4 is gripped by the second manipulator 6 at the re-gripping station 13 and/or in the rest section 14. In this process, the first component 4 is gripped on the second gripping surface 16 by the second manipulator 6.

As an alternative thereto, it is also conceivable according to an embodiment that is not shown in further detail that the first component 4 at least on some sections rests on at least one tool 17 of the processing device 3 and is supported thereon in a load-dissipating manner, while the first component 4 is gripped by the at least one second manipulator 6.

Figure 4:
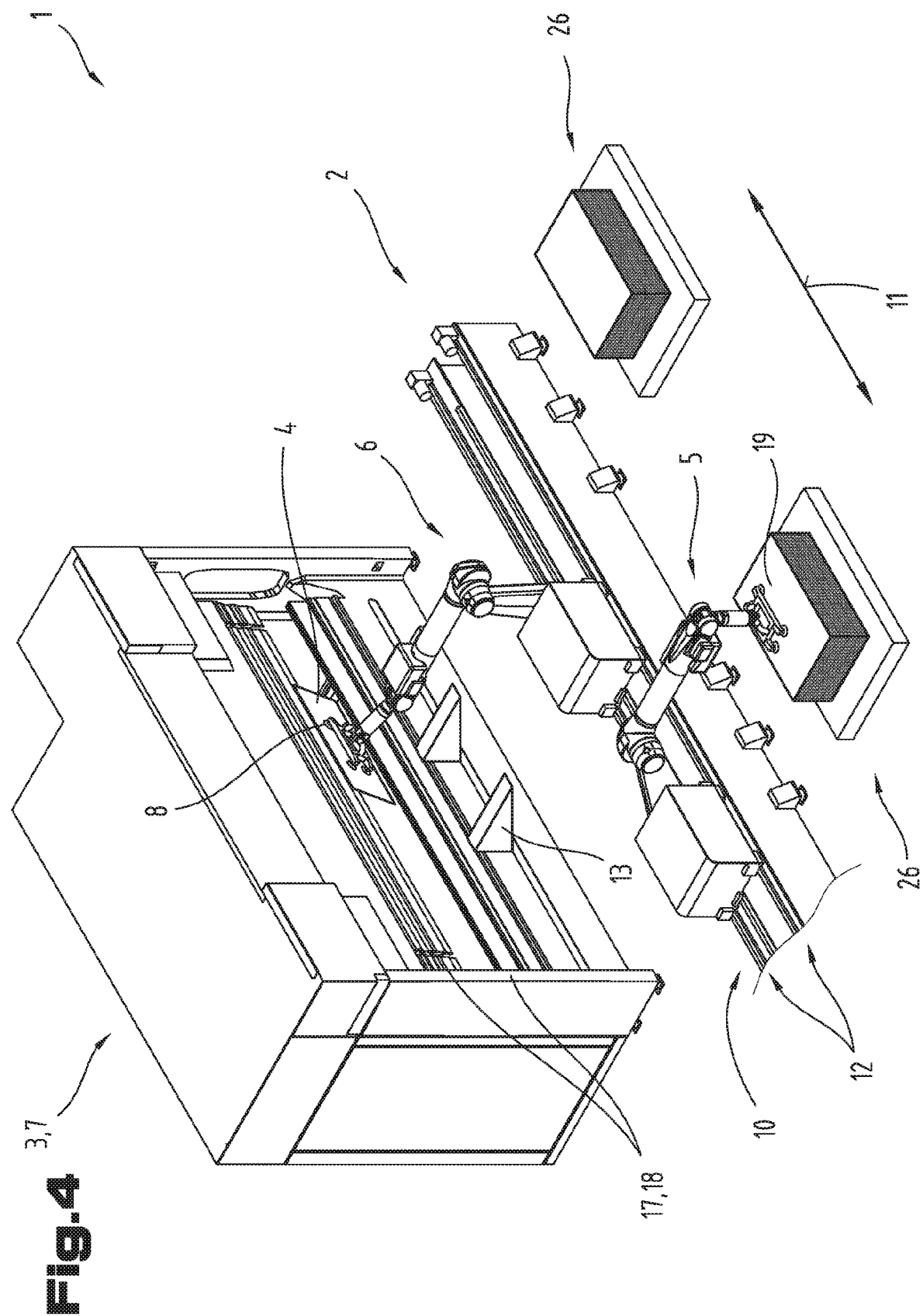
FIG. 4 the production plant having the manipulator arrangement and the processing device, wherein a second component is gripped by the first manipulator, and a second processing cycle is carried out on the first component.

FIG. 4 shows the production plant 1 having the manipulator arrangement 2 and the processing device 3, wherein a second component 19 is gripped by the first manipulator 5 while a second processing cycle is carried out on the first component 4. The second component 19 may, for example, be collected from a stack 26, on which components 4, 19 to be processed are stored.

During the second processing cycle, the first component 4 is held by the first manipulator 5 by means of the vacuum suction cups 8, and/or is moved by the first manipulator 5 along the travel path 10 in the longitudinal direction 11 to the different processing sections 9 of the processing device 3 and/or press brake 7.

Figure 5:
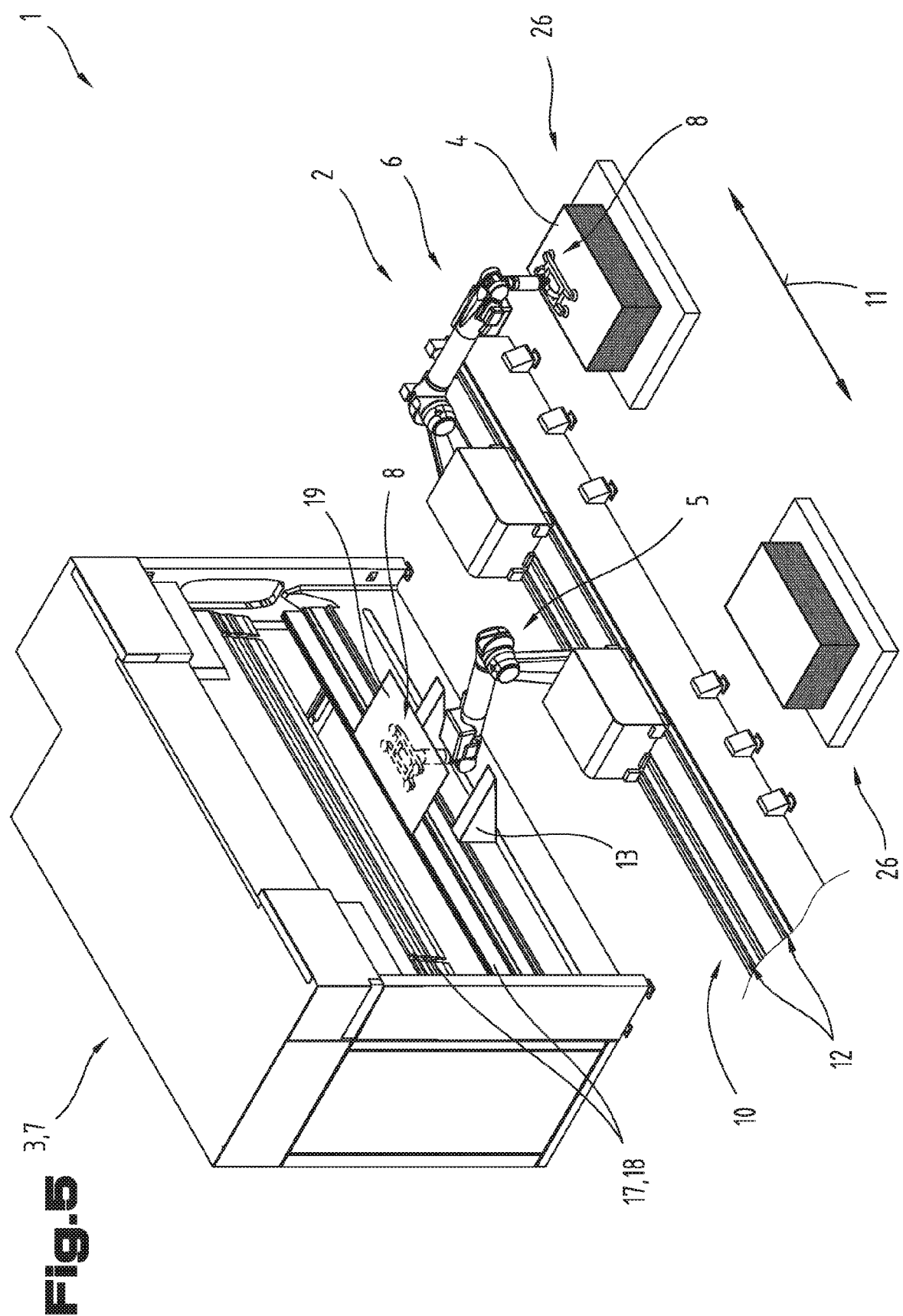
FIG. 5 the production plant having the manipulator arrangement and the processing device, wherein a first processing cycle is carried out on the second component, and the first component is deposited.

FIG. 5 shows the production plant 1 having the manipulator arrangement 2 and the production plant 3, wherein a first processing cycle is carried out on the second component 19, while the first component 4 is deposited by the second manipulator 6. In this regard, the first component 4 may be placed on a stack 26 or a pallet again, and/or it is also conceivable that the first component 4 is transported to a further production plant 1 not shown in further detail.

Figure 6:
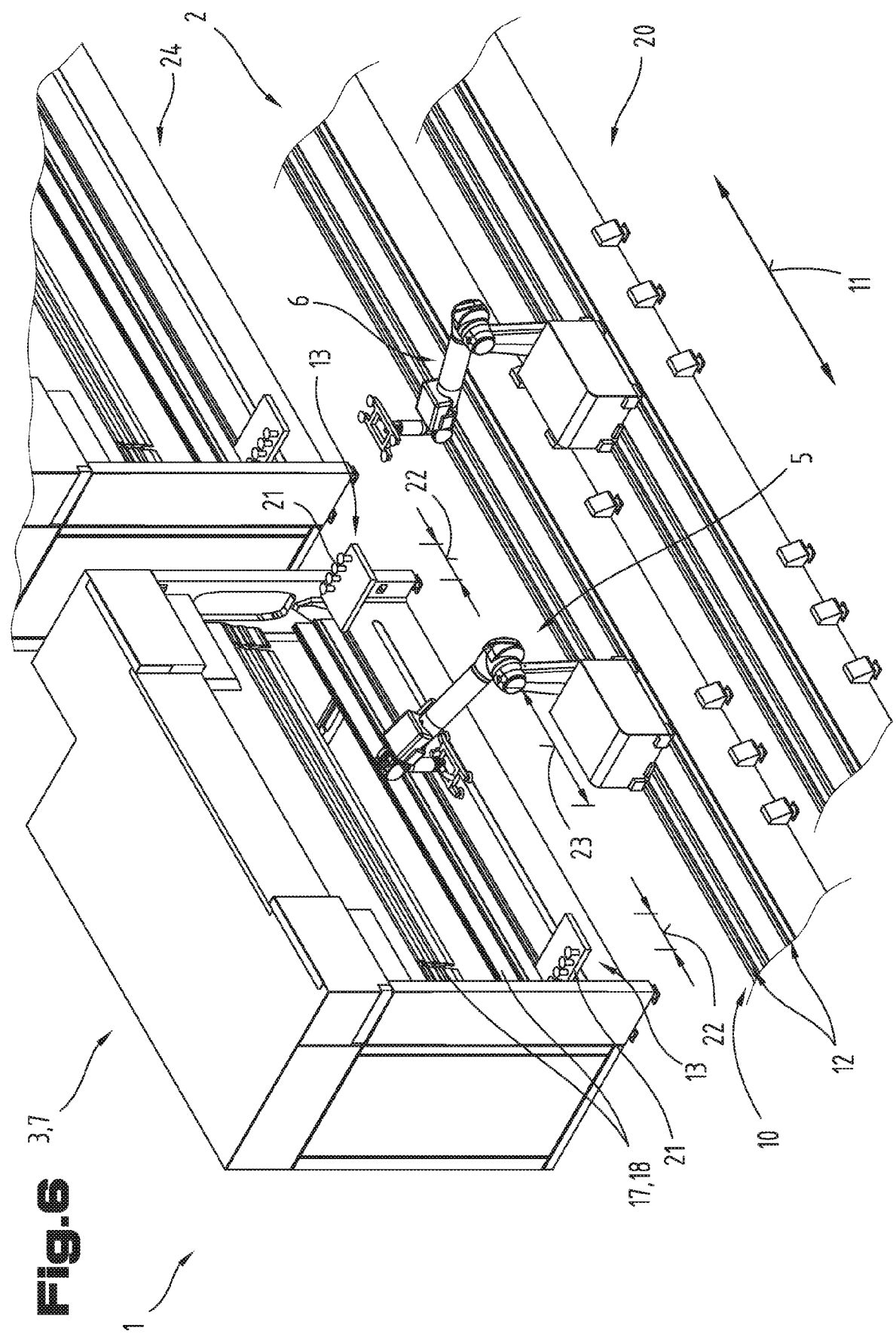
FIG. 6 an embodiment of a production plant having a manipulator arrangement and a processing device, wherein a first manipulator is displaced along a first travel path, and a second manipulator is displaced along a second travel path.

FIG. 6 shows a further and possibly independent embodiment of a production plant 1, wherein again, equal reference numbers and/or component designations are used for equal parts as in FIGS. 1 to 5 above. In order to avoid unnecessary repetitions, it is pointed to/reference is made to the detailed description in FIGS. 1 to 5 above.

FIG. 6 shows an embodiment of a production plant 1 having a manipulator arrangement 2 and a processing device 3, wherein a first manipulator 5 is displaced along a first travel path 10, and a second manipulator 6 is displaced along a second travel path 20.

The first travel path 10 and the second travel path 20 may again each be rail arrangements 12, along which the first manipulator 5 and the second manipulator 6 can be displaced and/or can be moved in the longitudinal direction 11.

In an embodiment, which is not shown in further detail, the second travel path 20 may, in this regard, be arranged above the first travel path 10, wherein the second manipulator 6 is arranged so as to be suspended on the second travel path 20.

According to the representation in FIG. 6, a first processing cycle with multiple processing steps is carried out on a first component 4. The second manipulator 6 is in a waiting position. After the first component 4 has been deposited at a re-gripping station 13, the second manipulator 6 can be displaced on the second travel path 20 such that the second manipulator 6 can collect the first component 4 again from the re-gripping station 13 for carrying out a second processing cycle.

As an alternative or in addition thereto, the re-gripping station 13 may be formed as a handling device 21 on the processing device 3, wherein the processing device 3 comprises a waiting section 22 and a re-gripping section 23 for the handling device 21. In this regard, the handling device 21 is moved out of the waiting section 22 into the re-gripping section 23 before a re-gripping time, and is moved out of the re-gripping time 23 into the waiting section 22 after the re-gripping time.

In this regard, a handling device 21 may also be, for example, a bending aid for a press brake 7, by means of which components 4, 19 can also be supported in the course of a processing cycle.

According to an embodiment, which is not shown in further detail, the at least one second processing cycle may also be carried out on a second processing device 24. The first processing device 3 may again be a press brake 7, and the second processing device 24 may be a swivel bending machine or also a press brake 7.

FIG. 7 shows a component 4, 19 having a first gripping surface 15 and a second gripping surface 16 in a lateral view. In this regard, the component 4, 19 may be gripped, held, and transported on the first gripping surface 15 by a first manipulator 5 and on the second gripping surface 16 by a second manipulator 6.

FIG. 8 shows the component 4, 19 with multiple partial sections 25 of the first gripping surface 15 in a top view. In this regard, the component 4, 19 can be gripped in the partial sections 25 by means of vacuum suction cups 8 arranged on the first manipulator 5 and/or second manipulator 6.

FIG. 9 shows a flowchart with multiple processing cycles on multiple components 4, 19.

At a point in time $t_0$, the first component 4 is gripped by a first manipulator 5. Subsequently, at a point in time $t_1$, a first processing cycle with at least one processing step is carried out on a first component 4 on a first processing device 3. At a point in time $t_2$, the first component 4 is deposited at a rest section 14 and/or a re-gripping station 13. At a point in time $t_3$, the first component 4 is gripped from the rest section 14 and/or the re-gripping station 13 by a second manipulator 6.

At a point in time $t_4$, a second component 19 is gripped by the first manipulator 5 for example from a stack 26, such as a stack 26 for starting materials in the form of sheet metal plates. At the same time, a second processing cycle with at least one processing step is carried out on the first component 4. While at a point in time $t_5$, the first component 4 is deposited by the second manipulator 6 for example on a stack 26 for final and/or intermediate products made of sheet metal plates, a first processing cycle is carried out on the second component 19.

At a point in time $t_6$, in further consequence, the second component 19 is deposited at the regripping station 13 and is supported in a load-dissipating manner by the processing device 3. At a point in time $t_7$, the second component 19 is gripped from the re-gripping station 13 by the second manipulator 6, and at a point in time $t_8$, a second processing cycle is carried out on the second component 19. At the same time, a third component 27 is gripped by the first manipulator 5. While at a point in time $t_9$, a first processing cycle is carried out on the third component 27, the second component 19 is, for example, deposited on a stack 26 for final and/or intermediate products. At a point in time $t_{10}$, in further consequence, the third component 27 is deposited at the re-gripping station 13. Next, at a point in time $t_{11}$, the third component 27 is gripped by the re-gripping station 13. During a second processing cycle on the third component 27 at a point in time $t_{12}$, a fourth component 28 is gripped, for example from a stack 26 for starting and/or raw materials, and at a point in time $t_{13}$, a first processing cycle is carried out on the fourth component 28. At the same time, the third component 27 is deposited by the second manipulator 6.

The gripping, carrying out a first processing cycle, depositing at a re-gripping station 13, gripping from the re-gripping station 13, carrying out a second processing cycle, and depositing can be carried out as often and/or as long as desired subsequently on multiple components 4, 19, 27, 28, wherein the gripping and/or depositing of components 4, 19, 27, 28 is carried out parallel to main time to the individual processing cycles and/or processing steps.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

Finally, as a matter of form, it should be noted that for ease of understanding of the structure, elements are partially not depicted to scale and/or are enlarged and/or are reduced in size.

LIST OF REFERENCE NUMBERS

1 Production plant
2 Manipulator arrangement
3 First processing device
4 First component
5 First manipulator
6 Second manipulator
7 Press brake
8 Vacuum suction cup
9 Processing section
10 First travel path
11 Longitudinal direction
12 Rail arrangement
13 Re-gripping station
14 Rest section
15 First gripping surface
16 Second gripping surface
17 Tool
18 Bending tool
19 Second component
20 Second travel path
21 Handling device
22 Waiting section
23 Re-gripping section
24 Second processing device
25 Partial section
26 Stack
27 Third component
28 Fourth component

The invention claimed is:

1. A method for transporting and/or handling components, the method comprising the steps of:
providing a manipulator arrangement with a first manipulator and at least one second manipulator, wherein the first manipulator and the at least one second manipulator are designed to grip, to transport, to hold and/or to deposit a component,
providing a processing device for performing processing steps on the component, the processing steps comprising a first processing cycle and at least one second processing cycle,
providing a regripping station comprising a handling device at the processing device, wherein the processing device comprises a waiting section and a regripping section for the handling device and wherein the waiting section is spaced apart from the regripping section in a horizontal direction,
gripping the component with the first manipulator, performing the first processing cycle,
moving the handling device out of the waiting section into the regripping section,
after performing the first processing cycle, transferring the component from the first manipulator to the at least one second manipulator during a predefined regripping time by depositing the component with the first manipulator at the regripping station, resting the component at least in some sections on the processing device and supporting the component in a load-dissipating manner solely by the processing device and gripping the component from the regripping station with the at least one second manipulator, wherein the predefined regripping time is a period of time between the first processing cycle and the at least one second processing cycle,
performing the at least one second processing cycle, and moving the handling device out of the regripping section into the waiting section after the regripping time.

2. The method according to claim 1, wherein the component comprises a first gripping surface and a second gripping surface different from the first gripping surface, wherein the step of gripping the component with the first manipulator further comprises gripping the component with the first manipulator on the first gripping surface and wherein the step of gripping the component from the regripping station with the at least one second manipulator further comprises gripping the component with the at least one second manipulator on the second gripping surface.

3. The method according to claim 2, wherein the first gripping surface is formed on an upper side of the component and the second gripping surface is formed on a bottom side of the component.

4. The method according to claim 1, further comprising a step of gripping a second component with the first manipulator during the at least one second processing cycle.

5. The method according to claim 1, further comprising a step of depositing the component with the at least one second manipulator apart from the processing device while a first processing cycle is performed on a second component.

6. The method according to claim 1, wherein the step of resting the component at least in some sections on the processing device and supporting the component in a load-dissipating manner solely by the processing device, during the predefined regripping time, further comprises resting the component, at least in some sections, on a tool of the processing device and supporting the component, at least in some sections on the tool.

7. The method according to claim 6, wherein the component is a sheet metal part, the at least one processing device is a bending machine, and the tool comprises an upper tool and a lower tool of the bending machine, further comprising the step of clamping the sheet metal part between the upper tool and the lower tool while the sheet metal part is gripped by the at least one second manipulator without contacting or impinging the sheet metal part with the first manipulator.

8. The method according to claim 1, wherein the step of performing the first processing cycle comprises a step of performing a first bending operation for producing a first deformation in the component and wherein the step of performing the at least one second processing cycle comprises a step of performing a second bending operation for producing a second deformation in the component, which second deformation extends in a mirror-inverted manner to the first deformation.

9. The method according to claim 1, further comprising a step of displacing the first manipulator and the at least one second manipulator along a common travel path in a longitudinal direction parallel to the common travel path.

10. The method according to claim 1, further comprising a step of displacing the first manipulator along a first travel path in a longitudinal direction parallel to the first travel path, and a step of displacing the at least one second manipulator along a second travel path, which second travel path extends in parallel with the first travel path, in the longitudinal direction.

11. The method according to claim 1, further comprising a step of carrying out the at least one second processing cycle on a second processing device.

12. A production plant for carrying out the method according to claim 1, comprising:

the manipulator arrangement having the first manipulator and the at least one second manipulator;

the processing device for performing processing steps on the component, wherein a rest section is provided on the processing device, in which rest section the component is supported in a load-dissipating manner during the regripping time, wherein the regripping station is formed in the rest section, by which regripping station the component can be supported in a load-dissipating manner during the regripping time, wherein the regripping station is formed as the handling device at the processing device, wherein the processing device comprises the waiting section and the regripping section for the handling device, and the waiting section and the regripping section are spaced apart from each other in the horizontal direction, and wherein the handling device can be moved out of the waiting section into the regripping section and vice versa.

13. The production plant according to claim 12, wherein a common travel path for the first manipulator and for the at least one second manipulator is provided.

14. The production plant according to claim 12, wherein a first travel path for the first manipulator and a second travel path for the at least one second manipulator are provided.

15. The production plant according to claim 12, further comprising a second processing device, on which the at least one second processing cycle is carried out.

* * * * *